(12) United States Patent
Banga et al.

(10) Patent No.: US 12,716,797 B2
(45) Date of Patent: Aug. 25, 2026

(54) CRYPTOGRAPHIC TRANSDUCER CALIBRATION SYSTEM FOR HOSE ASSEMBLY TEST BENCHES

(71) Applicant: ContiTech USA, Inc., Fairlawn, OH (US)

(72) Inventors: Cameron Banga, Valparaiso, IN (US); Jeremy Jay Lidgett, Valparaiso, IN (US); Michael Wilder, Valparaiso, IN (US); Jaroslaw Zakrzewski, Wadsworth, OH (US)

( * ) Notice: Subject to any disclaimer, the term of this patent is extended or adjusted under 35 U.S.C. 154(b) by 222 days.

(21) Appl. No.: 18/459,422

(22) Filed: Sep. 1, 2023

(65) Prior Publication Data

US 2023/0408360 A1 Dec. 21, 2023

Related U.S. Application Data

(63) Continuation of application No. 17/302,407, filed on May 3, 2021, now Pat. No. 11,774,311.

(51) Int. Cl.

*G01L 27/00* (2006.01)
*G06F 16/25* (2019.01)
*G06F 21/60* (2013.01)

(52) U.S. Cl.

CPC .......... *G01L 27/007* (2013.01); *G01L 27/002* (2013.01); *G06F 16/252* (2019.01); *G06F 21/602* (2013.01)

(58) Field of Classification Search

CPC ... G01L 27/007; G01L 27/002; G01L 27/005; G06F 16/252; G06F 21/602; A62C 33/00; A62C 37/50; G01D 18/00; G01M 3/2846
See application file for complete search history.

(56) References Cited

U.S. PATENT DOCUMENTS 4,590,791 A * 5/1986 Reed ..................... G01L 27/005 73/1.61
4,658,829 A * 4/1987 Wallace ................ G01L 27/005 73/1.64
7,828,611 B2 11/2010 Nakamura et al.
8,308,201 B2 11/2012 Duquette et al.
(Continued)

FOREIGN PATENT DOCUMENTS

DE 102013114399 A1 * 6/2015 ............. G01D 18/00
WO 2009138893 A1 11/2009
WO WO-2012071424 A2 * 5/2012 ............. G01M 5/00

OTHER PUBLICATIONS

Porter et al. / One-Way Hash Function, 2007.
(Continued)

*Primary Examiner* — Alvaro E Fortich
*Assistant Examiner* — Carl F.R. Tchatchouang
(74) *Attorney, Agent, or Firm* — Iken S. Sans; Richard A. Wolf; Gregory Adams

(57) ABSTRACT

A testbench system is disclosed. The system includes a network interface; a memory storage; a transducer; and one or more processors. The one or more processors are configured to operate in a first phase and: perform calibration of the transducer and generate calibration data; generate a unique identification (CTS-ID) for the transducer based on the calibration data; mark the transducer with the CTS-ID; and provide the CTS-ID and the calibration data to the network interface for transmission to a database.

20 Claims, 4 Drawing Sheets

(56) References Cited

U.S. PATENT DOCUMENTS

| | | | | |
|---|---|---|---|---|
| 9,106,066 | B2 | 8/2015 | Sakakura | |
| 9,249,773 | B2 | 2/2016 | Cunningham et al. | |
| 10,003,136 | B2 | 6/2018 | Ohnuma | |
| 10,245,455 | B2 * | 4/2019 | Mullins | G09B 19/24 |
| 11,860,009 | B2 * | 1/2024 | Roberts | G01F 1/26 |
| 11,940,777 | B2 * | 3/2024 | Fornander | G05B 19/4183 |
| 2005/0222794 | A1 * | 10/2005 | Baird | G01L 27/002 702/104 |
| 2009/0248324 | A1 | 10/2009 | Hamilton et al. | |
| 2010/0102974 | A1 * | 4/2010 | Keast | F15B 19/005 340/626 |
| 2013/0218501 | A1 * | 8/2013 | Artiuch | G01L 27/005 702/98 |
| 2014/0061962 | A1 * | 3/2014 | Lane | B29C 70/54 264/40.3 |
| 2015/0083810 | A1 | 3/2015 | Ching et al. | |
| 2016/0097397 | A1 * | 4/2016 | Alexander | F04D 15/0088 73/168 |
| 2016/0237944 | A1 * | 8/2016 | Adelman | F02D 41/3082 |
| 2020/0294401 | A1 | 9/2020 | Kerecsen | |

OTHER PUBLICATIONS

Anonymous / Series GT32XX—High Pressure, Fatigue Rated Pressure Transducers—Stellar Tech Datasheet / May 1, 2015.

International Search Report dated Aug. 11, 2022 of International Application PCT/US2022/072031 claiming priority the same application which this one is based.

* cited by examiner

CRYPTOGRAPHIC TRANSDUCER CALIBRATION SYSTEM FOR HOSE ASSEMBLY TEST BENCHES

CROSS REFERENCE TO RELATED APPLICATIONS

This Patent Application is a Continuation Application of U.S. patent application Ser. No. 17/302,407 filed May 3, 2021, which is incorporated herein in its entirety, by reference.

FIELD

The disclosure generally relates to systems and methods for hose assembly and identification.

BACKGROUND

Industrial hoses are commonly used to transport hydraulic fluid, fluid, gas, solid, food, beverage, steam, petroleum, chemicals, gasses, and air. Additionally, these hoses are typically assembled with fittings to facilitate connection to vessels, other hoses, systems, tanks, tankers, other hoses, platforms and the like.

Hoses are typically assembled by crimping or attaching a fitting to an end of hose. This includes selecting a fitting and then attaching that fitting.

What is needed are techniques to facilitate fitting and hose assembly and use of hose crimping machines.

DETAILED DESCRIPTION

Figure 1:
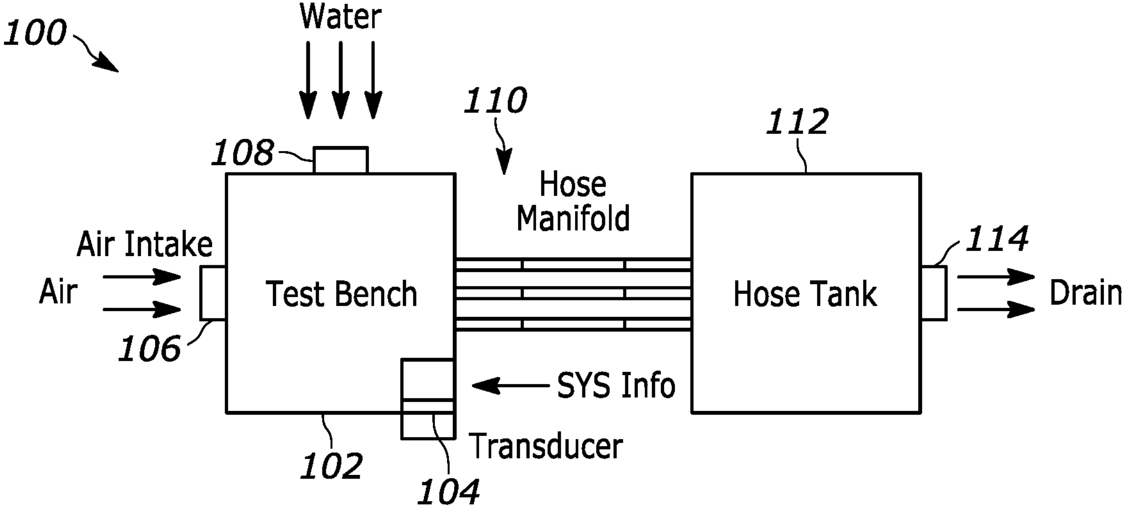
FIG. 1 is a diagram illustrating a test bench system 100 for testing hoses in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Through the testing and analysis of hydraulic or industrial hoses in a hose test bench, a high pressure transducer is typically used in order to accurately measure the fluid pressure in the test hose. Over the course of the past decade, Custom Crimp has used a variety of transducers in our legacy test bench. A common example is the Stellar Technologies 3200 series transducer: https://www.stellartech.com/products/techsheets-press/gt32xx.pdf, hereby incorporated by reference.

Transducers are used in a variety of industries and functions for measuring pressure, and are a common instrument. However it is appreciated that there is lacking an ability for the transducer to validated that it is within specification tolerances, and then keep an audit log of its calibrated status in order to ensure accurate testing. This offers benefit to Continental's customer, as they can use the audit/calibration history in order to prove proper function of the test bench.

One or more embodiments are described that include an entire enclosed and controlled system, where a transducer is calibrated at the factory and assigned a unique cryptographic hash derived from metadata properties determined at the time of initial factory calibration. This hashed identifier can then be laser etched upon the transducer before final installation and inclusion in a shipped product.

The crimper calibration audit record is then stored securely, encrypted into the CrimpCloud web database. Throughout the history of the machine, if a transducer is serviced or replaced, the audit log can be updated via a secure SSL/TLS encrypted connection by a Continental service representative via a tablet, laptop, or phone, and updated to the cloud audit trail, tied directly to the unique transducer.

The end user customer can then view this report log on the CrimpCloud database, validate that their machine has a proper service and calibration, and then also print a certificate for end user customers in order to validate that the machine is properly serviced.

FIG. 1 is a diagram illustrating a test bench system 100 for testing hoses in accordance with one or more embodiments. It is appreciated that the system 100 is provided for illustrative purposes and that suitable variations are contemplated.

The system 100 includes a test bench 102, a hose manifold 110 and a hose tank 112.

The test bench 102 includes a water intake 108 and an air intake 106. The water intake 108 is configured to intake water and/or other liquids. The air intake 108 is configured to input or intake air and/or other gases.

The test bench 102 also includes a transducer 104 configured to measure pressure of a hose or the hose tank 112 and measure pressure. The transducer 104 is configured to output measurements in analog and/or digital format.

The hose manifold 110 selectively connect hoses and/or the hose tank 112 to the test bench 106.

The hose tank 112 includes a hose tank drain 114 configured to drain liquid and/or gas from the hose after testing is completed.

During operation or testing, the test bench 102 is configured to intake gas and/or liquid and into the hose being tested. The transducer 104 provides or generates pressure measurements. The test bench 102 is configured to determine if the hose passes or fails based on the generated pressure measurement and the amount of input gas and/or liquid.

The hose being tested has an identification that is used to obtain performance thresholds from a database 318. If the hose operates successfully within those performance thresholds, it is deemed passed. Otherwise, the hose is failed.

The test bench 102 is also configured to verify that the transducer 104 has been properly calibrated prior to testing the hose. To verify, the test bench 102 sends a transducer identification CTS-ID for the transducer 104 to the database 318. The test bench 104 receives a valid/nonvalid for the transducer 104 from the database 318.

The transducer 104 is configured to input current pressure readings of the hose connected to the manifold and measures at the manifold, in pounds per square inch (PSI) in one example. The transducer provides an output current or current loop, such as 4-20 milli-Amps, based on the pressure readings.

Figure 2:
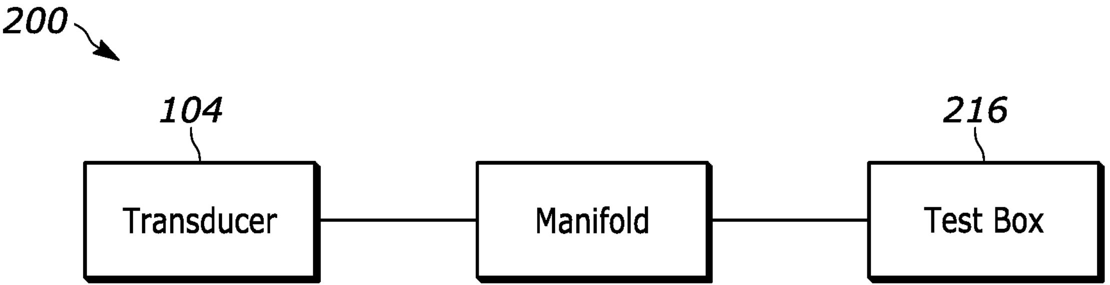
FIG. 2 is a diagram illustrating a test bench system 200 in accordance with one or more embodiments.

FIG. 2 is a diagram illustrating a test bench system 200 in accordance with one or more embodiments.

The system 200 is a portion of the system 100 of FIG. 1.

The system 200 includes the transducer 104, the manifold 110 and a test box 216.

The test box 216 is part of the test bench 102 and is configured to verify and/or confirm that the transducer 104 is valid and properly calibrated.

The test box 216 is configured to prevent testing and/or operation of the test bench 102 if the transducer 104 is not valid and/or properly calibrated.

The test box 216 includes an input as a receiving manifold, with a hose connected between test box and test bench, to read pressure independently of test bench via a second transducer. In a suitable variation, there is a version where the input is metadata manually entered by a technician via 618 such as a touch screen or tablet, where the user reads results of a pressure gauge attached to the manifold. The "output" for this box would be a pass/fail response as to if the transducer on the test bench is in a calibrated state.

Figure 3:
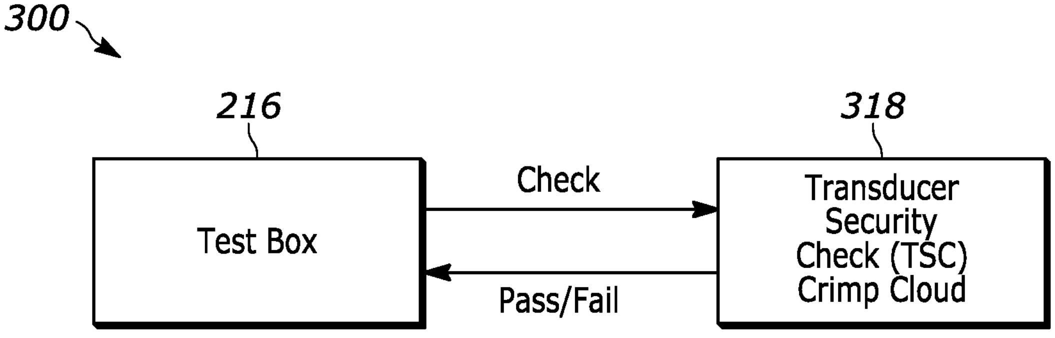
FIG. 3 is a diagram illustrating a test bench system 300 in accordance with one or more embodiments.

FIG. 3 is a diagram illustrating a test bench system 300 in accordance with one or more embodiments.

The test box 216 is configured to send a transducer check for the transducer 104 to a database 318. The check includes a cryptographic authorization, such as a hash.

The database 318 receives the check and verifies the authenticity of the check via the authorization or hash. The database 318 can also determine whether proper calibration has been performed.

The database 318 sends a pass/fail message back to the test box 216.

It is appreciated that a connection between the test bench 102 and/or test box 216 with the database 318. The database 318 can also be referred to as CrimpCloud. The connection to CrimpCloud/database 318, allows for engineering and production teams to assess a transducer and create a unique Calibrated Transducer System (CTS)-Identifier (ID) for the specific transducer, and then retain this ID for future reference and use. A service technician can service a transducer and cross check the CTS-ID against the test bench's history. This validation could occur using the test bench itself to connect to CrimpCloud using a secure SSL/TLS connection. Additionally, this service can occur via an external laptop, phone, or tablet with internet connectivity.

Over time, as data is collected by the CrimpCloud system 318 with respect to maintenance history on a variety of test benches and transducers, predictive maintenance schedules can also be developed and designed based on analysis of aggregate data using server-side analysis.

Figure 4:
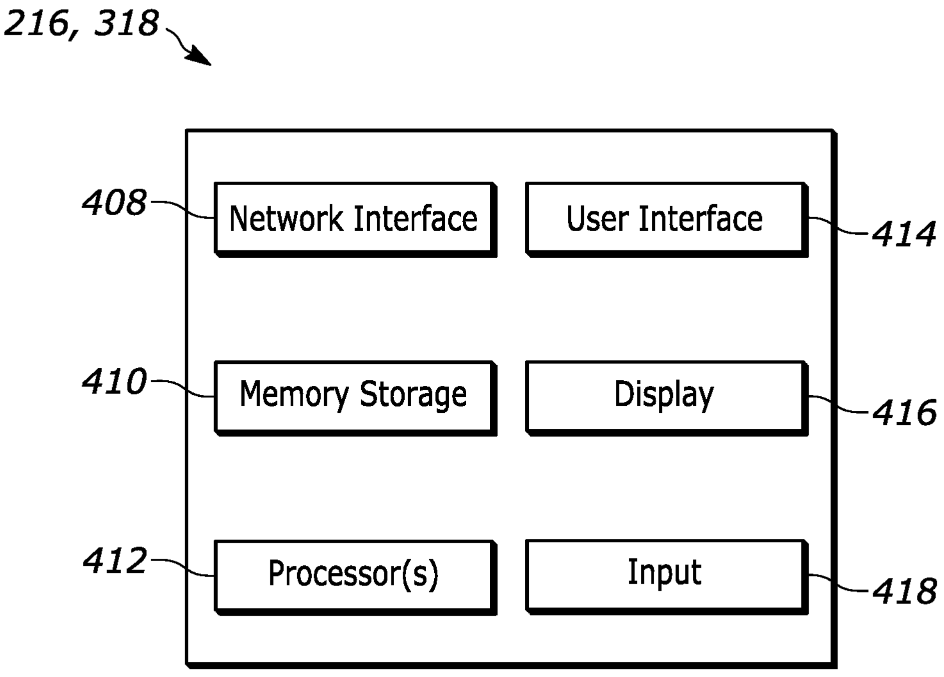
FIG. 4 is a diagram illustrating the test box 216 and/or the database 318 in accordance with one or more embodiments.

FIG. 4 is a diagram illustrating the test box 216 and/or the database 318 in accordance with one or more embodiments. The test box 216 and/or the database 318 is depicted for illustrative purposes and it is appreciated that other elements/components are contemplated.

The test box 216 and/or database includes a network interface 408, a memory storage 410, one or more processors 412, a user interface 414, a display 416 and an input device 418.

The network interface 408 is an interface to a transmitter/receiver/transceiver and can be coupled to a network, such as a cloud network, 5G, 3G, the Internet, and the like.

The network interface 408 is configured to receive hose specifications and the like from a network.

Additionally, the network interface 408 is configured to receive test results from the network. The network interface 408 can be coupled to a transceiver (not shown) that receives information from the network and provides information to the network.

The memory 410 can be a volatile and/or non-volatile memory.

The one or more processors 412 are configured to receive the hose specifications, transducer identification and the like.

The one or more processors 412 are also configured to generate information based on the hose specifications, identifications and the like. The one or more processors 412 can include PLC (Programmable Logic Controller) to implement functionality of the 216, 318 and the like.

The user interface 414 is connected to the processor 412, the memory storage 410 and/or the network interface 408. The user interface 414 can provide or display test results and the like. Additionally, the user interface 414 can receive input information related to the hose assembly, such as hose characteristics, fitting size and the like.

In one example, the user interface 414 includes the display 416 and the input device 418. The display 416 can provide the test results, and the like. The input device 418 can be configured to initiate testing, select tests to perform, and input the information related to the hose to be tested.

The transducer generates the 4-20 mA Current Loop output. The test box 216 is configured to convert this value to PSI using a mathematical conversion based on the transducer's PSI rating.

Figure 5:
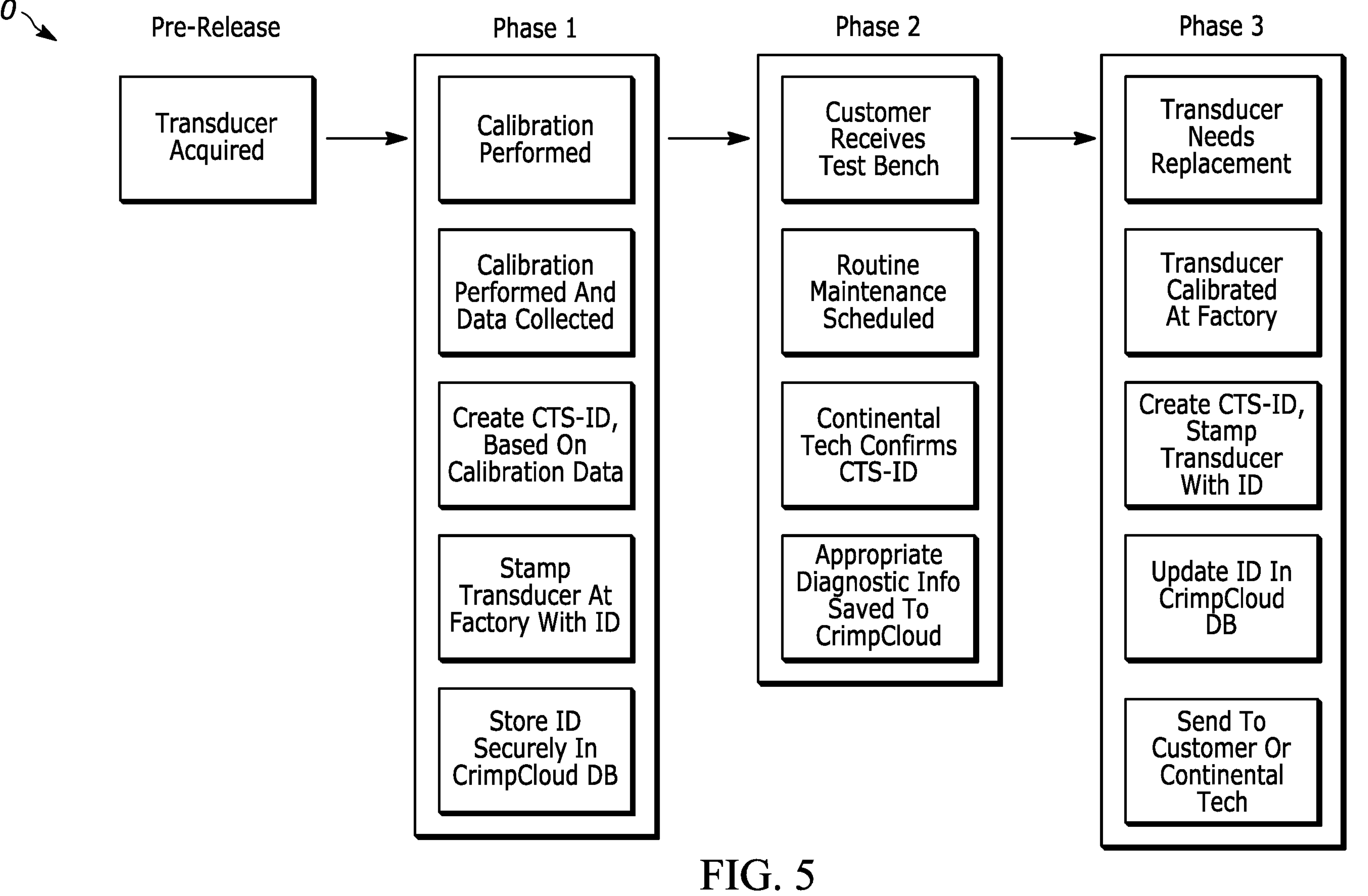
FIG. 5 is a diagram illustrating operation 500 of a test bench system in accordance with one or more embodiments.

We read this signal via the Test Bench's PLC (Programmable Logic Controller) and convert this current to PSI, using a mathematical conversion based on the transducer's PSI rating FIG. 5 is a diagram illustrating operation 500 of a test bench system in accordance with one or more embodiments. The operation 500 is provided for illustrative purposes and it is appreciated that suitable variations are contemplated.

The operation 500 can be performed with the system 100 and variations thereof. The operation is a Lifecycle graphic for an overview of an example transducer installation and service procedure.

In the Pre-Release phase, a transducer is acquired by the team for a test bench based on the technical requirements of the customer. Typically, the transducer is chosen for a particular test bench based on the pressure testing requirements of the customer.

The pre-release phase generally occurs prior to delivery of the system to a customer and/or during manufacturing.

The transducer can be the transducer 104, described above.

In Phase 1, calibration of the transducer is performed. Data regarding the calibration is collected. An identification (CTS-ID) is created based on the calibration data. The transducer is marked with the CTS-ID. In one example, the CTS-ID is stamped on the transducer. The CTS-ID is stored in the database 318 using security such as cryptography.

In Phase 1, the transducer is calibration verified by a Continental representative and the associated calibration metadata (eg, date of verification, representative performing calibration, transducer model, etc) is then used to generate the CTS-ID. This ID is securely stored in the CrimpCloud database, encrypted at rest.

In Phase 2, a customer receives a test bench. Routine maintenance for the test bench is scheduled. The CTS-ID for the associated transducer is confirmed, such as confirmed by a technician. Diagnostic information regarding the routine maintenance is stored in the database 318.

During the routine maintenance, the test bench 102 may determine that the transducer needs replacement.

For Phase 2, the test bench has reached the customer site and is ready to be used in testing. After a period of time and ordinary use, the test bench will eventually require service by a Continental trained technician. During the service visit, the technician then verifies the CTS-ID of the transducer against the validated record stored securely in CrimpCloud. As required, the technician then performs proper maintenance on the transducer and enters this maintenance data into CrimpCloud tied to the particular transducer.

In Phase 3, a replacement transducer is calibrated at a factory or the like. The replacement transducer is marked with a new CTS-ID. The new CTS-ID is stored in the database 318 using security such as cryptography. The test bench 102 is updated in the database 318 with the new CTS-ID. The replacement transducer is installed and replaces the original transducer.

Finally in Phase 3, there may come a time during the life of the test bench where the transducer is in need of replacement due to failure. Under this scenario, the customer would order a new transducer through their sales representative. At this time, a new transducer would be prepared, have its calibration validated, and a new CTS-ID would be created and stamped onto the transducer before being sent out for replacement.

Figure 6:
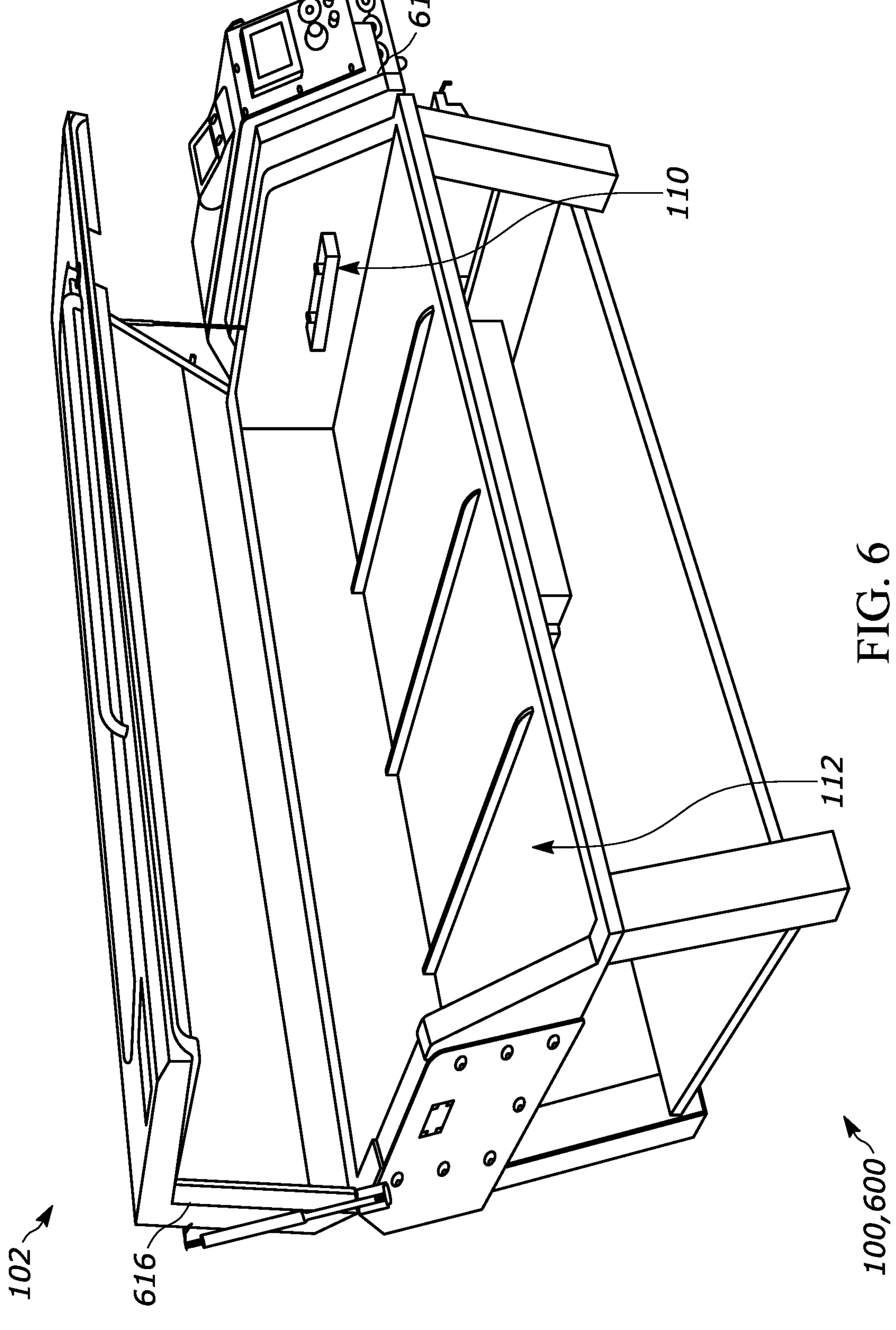
FIG. 6 is another diagram illustrating the test bench system 100 for testing hoses in accordance with one or more embodiments.

FIG. 6 is another diagram illustrating the test bench system 100 for testing hoses in accordance with one or more embodiments. It is appreciated that the system 100 is provided for illustrative purposes and that suitable variations are contemplated.

The hose tank 112 is depicted on a left side of the test bench 102 in this example. A hinged tank cover 616 is configured to open to allow insertion and/or removal of hoses for testing. The cover 616 is closed during testing for safety purposes.

The hose manifold 110 is shown on a right side of the hose tank 112. A hose to be tested is connected to the manifold 110 prior to testing.

A control panel or user interface 618, 414 is shown on a right side of the test bench 102. The user interface 618, 414 is configured to display test results and related information. Additionally, the user interface 618, 414 is configured to input hose information, test information, and transducer related information.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It is appreciated that the various aspects/embodiments can utilize short-range communication, such as near field communication (NFC). The NFC standard related to the radio-frequency identification (RFID) standard describes a communication protocol for transmitting information between two devices.

An RFID tag can be used, which includes a radio transponder; a radio receiver and transmitter. When triggered by an electromagnetic interrogation pulse from a nearby RFID reader device, the RFID tag transmits digital data, such as an identifying number, back to the reader. Passive RFID tags are powered by energy from the RFID reader's interrogating radio waves. Active RFID tags are powered by a battery and thus can be read at a greater range from the RFID reader; up to hundreds of meters. Unlike a barcode, the tag doesn't need to be within the line of sight of the reader, so it may be embedded in the tracked object. RFID is one method of automatic identification and data capture (AIDC). It is appreciated that the various aspects/embodiments can utilize RFID tags and/or other techniques of AIDC.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various examples are provided, however it is appreciated that suitable variations are contemplated.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes a testbench system for analyzing hoses. The testbench system also includes a network interface. The testbench system also includes a memory storage. The testbench system also includes a transducer. The testbench system also includes one or more processors configured to operate in a first phase and: perform calibration of the transducer and generate calibration data, generate a unique identification (CTS-ID) for the transducer based on the calibration data, mark the transducer with the CTS-ID, and provide the CTS-ID and the calibration data to the network interface for transmission to a database.

Implementations may include one or more of the following features. The system where the one or more processors are further configured to operate in a second phase and: confirm the CTS-ID of the transducer via the network interface and the database using a hash code and/or encryption; perform maintenance of the transducer and generate diagnostic information; and provide the diagnostic information to the network interface for transmission to the database. The one or more processors are further configured to operate in a third phase and: determine that the transducer needs replacement based on the generated diagnostic information; calibrate a replacement transducer and generate a replacement CTS-ID; provide the replacement CTS-ID via the network to the database. The system the one or more processors are configured to encrypt the CTS-ID. The system the database is configured to decrypt the CTS-ID and send confirmation of the CTS-ID to the network interface. The system the one or more processors configured to perform hashing on the CTS-ID to generate a hashed CTS-ID and provide the hashed CTS-ID to the network interface. The system the one or more processors configured to confirm operation of the transducer with a second transducer. The system may include a hose tank configured to store and cover a hose for testing. The system may include a hose manifold configured to receive a hose for testing. The transducer is configured to measure a hose pressure via the manifold and generate a control loop voltage based on the measured hose pressure. The system the one or more processors configured to convert the control loop voltage to a digital value. The system the digital value is pounds per square inch (PSI). The system the system may include a programmable logic controller (PLC) to convert the control loop voltage. The system may include a test box having a second transducer and at least a portion of the one or more processors are located within the test box. Implementations of the described techniques may include hardware, a method or process, or computer software on a computer-accessible medium.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A testbench system for analyzing hoses, the system comprising:

a network interface; and one or more processors configured to:

verify that a replaceable transducer is valid and/or properly calibrated by reading a cryptographic hash on the replaceable transducer;

determine that the replaceable transducer needs replacement based on diagnostic information;

calibrate the replaceable transducer and generate a replacement identifier; and provide the replacement identifier via the network interface to a database;

wherein the testbench system prevents initiation of a test to be performed on a hose when the one or more processors fails to verify that the replaceable transducer is valid and/or properly calibrated.

2. The system of claim 1, wherein the one or more processors are configured to generate the diagnostic information and generate the replacement identifier for the replaceable transducer based on calibration data.

3. The system of claim 2, wherein the one or more processors are configured to perform calibration of the replaceable transducer to generate the calibration data.

4. The system of claim 2, wherein the one or more processors are configured to provide the replacement identifier and the calibration data to the network interface for transmission to a database.

5. The system of claim 1, wherein the one or more processors are further configured to operate in a second phase to:

confirm the replacement identifier of the transducer via the network interface and the database using a hash code and/or encryption;

perform maintenance of the transducer and generate diagnostic information; and provide the diagnostic information to the network interface for transmission to the database.

6. The system of claim 5, wherein the one or more processors are configured to encrypt the replacement identifier.

7. The system of claim 6, wherein the database is configured to decrypt the replacement identifier and send confirmation to the network interface.

8. The system of claim 7, the one or more processors configured to perform hashing on the identification.

9. The system of claim 1, the one or more processors configured to confirm replacement of the transducer.

10. The system of claim 1, further comprising a hose tank configured to store and cover a hose for testing.

11. The system of claim 1, further comprising a hose manifold configured to receive a hose for testing.

12. The system of claim 11, wherein the replaceable transducer is configured to measure a hose pressure via the manifold and generate a control loop voltage based on the measured hose pressure.

13. The system of claim 12, the one or more processors configured to convert the control loop voltage to a digital value.

14. The system of claim 13, wherein the digital value is pounds per square inch (PSI).

15. The system of claim 13, the system further comprising a programmable logic controller (PLC) to convert the control loop voltage.

16. The system of claim 1, further comprising a test box having a second transducer, and wherein at least a portion of the one or more processors are located within the test box.

17. The system of claim 1, the database comprising one or more processors configured to verify a hash code of the replacement identifier and/or decrypt the identification.

18. The system of claim 1, the one or more processors configured to lookup a location for the replacement transducer.

19. A testbench system for analyzing hoses, the system comprising:

a replaceable transducer;

a hose tank to store and cover a hose for testing;

a hose manifold to receive the hose for the testing;

a network interface; and one or more processors configured to:

verify that a replaceable transducer is valid and/or properly calibrated by reading a cryptographic hash on the replaceable transducer;

perform the testing to generate diagnostic information for the replaceable transducer;

determine that the replaceable transducer needs replacement based on the diagnostic information;

calibrate the replaceable transducer and generate a replacement identifier; and provide the replacement identifier via the network interface to a database;

wherein prior to a test being performed on the hose, the testbench system prevents initiation of the test to be performed on the hose when the one or more processors fails to verify that the replaceable transducer is valid and/or properly calibrated.

20. The system of claim 19, wherein the replaceable transducer is assigned a unique identifier (CTS-ID).

* * * * *